United States Patent [19]
Rogers et al.

[11] Patent Number: 5,365,651
[45] Date of Patent: Nov. 22, 1994

[54] AIRBAG ASSEMBLY SYSTEM AND TOOL

[75] Inventors: Mark Rogers, Roy; Bradley L. Orme, North Odgen; Larry D. Rose, Layton, all of Utah

[73] Assignee: Morton International, Inc., Chicago, Ill.

[21] Appl. No.: 86,249

[22] Filed: Jul. 1, 1993

[51] Int. Cl.$^5$ .............................................. B23Q 3/00
[52] U.S. Cl. ........................................ 29/468; 29/464; 29/272; 280/736
[58] Field of Search ............... 29/426.1, 426.2, 455.1, 29/464, 466, 467, 468, 271, 272; 280/736, 741

[56] References Cited
U.S. PATENT DOCUMENTS

| | | | |
|---|---|---|---|
| 1,822,649 | 9/1931 | Evans | 29/271 |
| 1,838,134 | 12/1931 | Cozzens | 29/271 |
| 3,000,097 | 9/1961 | Hartz | 29/426.4 |
| 4,158,696 | 6/1979 | Wilhelm | 280/736 |
| 4,827,593 | 5/1989 | Markiselle | 29/426.4 |
| 4,878,690 | 11/1989 | Cunningham | 280/736 |

*Primary Examiner*—Mark Rosenbaum
*Assistant Examiner*—David P. Bryant
*Attorney, Agent, or Firm*—George W. Rauchfuss; Gerald K. White

[57] ABSTRACT

A system for installing the keyed stud of a cylindrical inflator into a keyed opening in the endwall of a passenger side airbag reaction module canister includes a special alignment tool. The tool has a profile which matches that of the stud and opening. It is inserted into the opening and engages and aligns the stud which is then moved into the opening.

13 Claims, 3 Drawing Sheets

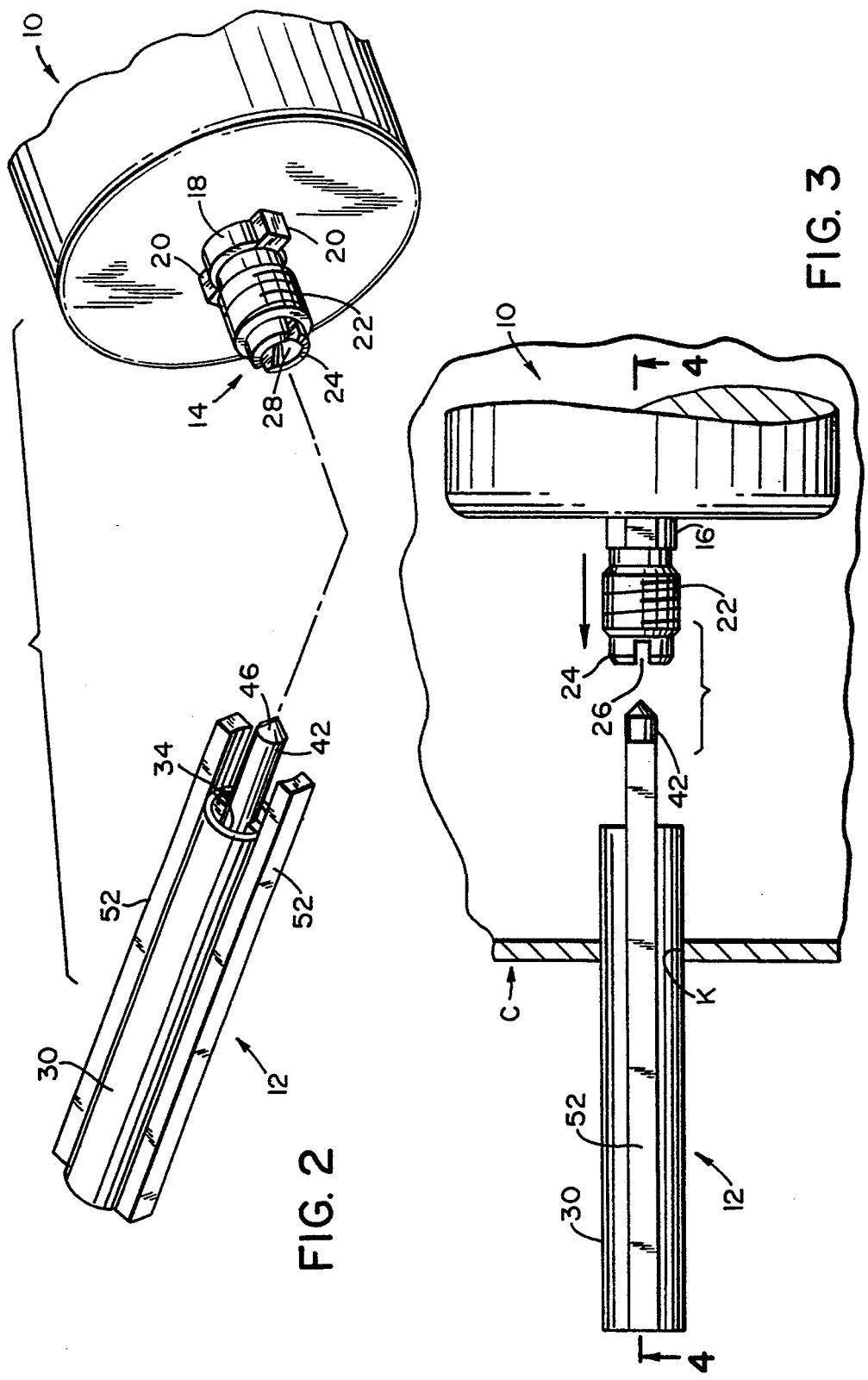

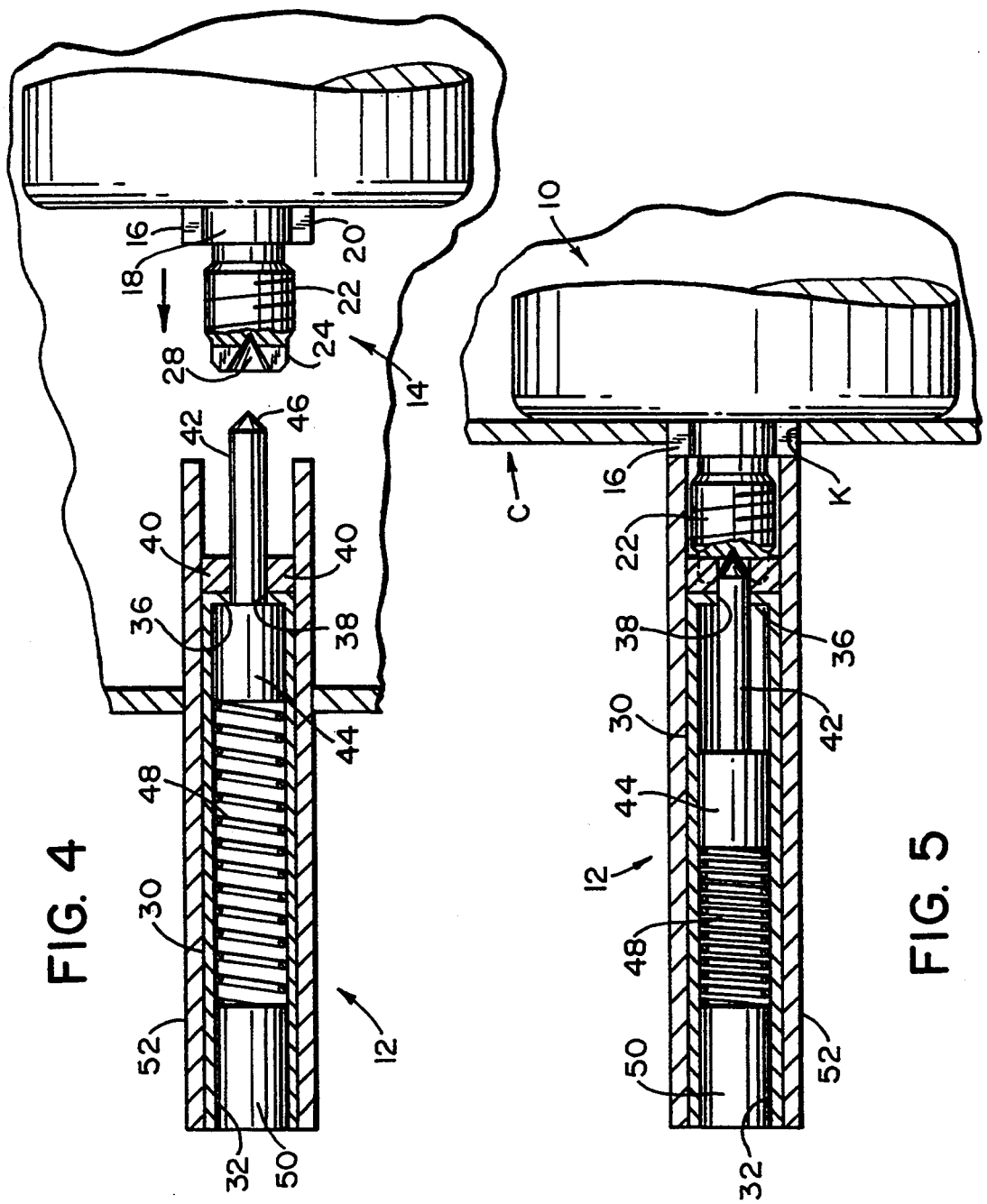

AIRBAG ASSEMBLY SYSTEM AND TOOL

TECHNICAL FIELD

This invention relates to airbags for motor vehicles. More particularly, it relates to improvements in the assembly of passenger-side airbag modules.

BACKGROUND ART

Conventionally, the passenger side airbag module for an automobile comprises a trough-shaped reaction canister having endwalls and a cylindrical inflator contained therein. The inflation cylinder is mounted in the reaction canister by passing it through a hole in one of the endwalls. A threaded stud extends from the end of the inflation cylinder and passes through a hole in the other wall where it is retained by a nut.

The inflation cylinder contains holes through which gas escapes to inflate the airbag when a crash occurs. The position of these holes within the reaction canister is critical in order to ensure that proper airbag inflation takes place. For this reason, it has been proposed to key the threaded stud to its opening in the reaction canister endwall whereby the inflation cylinder will be fixed in one of two possible alignments 180° apart. One proposal has been to provide one or two "flats" on the threaded stud surface and provide the hole in the endwall with a matching shape. However, it would be desirable to avoid the use of interrupted threads.

A second problem arises from the fact that the assembly of the inflator into the reaction canister is essentially a "blind" operation. This makes assembly a difficult task.

Accordingly, it is a primary object of the present invention to provide an improved system for installing an inflator in an airbag reaction canister in a preselected rotational alignment. Another object is to provide such a system including a tool which cooperates with the inflator stud to facilitate the assembly. Other objects, features, and advantages will become apparent from the following description and appended claims.

DISCLOSURE OF INVENTION

An airbag inflator is provided which has a keyed end stud adapted to fit within a matching opening in the endwall of a reaction module canister. An alignment tool includes means for engaging the keyed end stud and has a profile corresponding to the opening and keyway in the reaction canister endwall. The alignment tool is inserted through the keyed wall opening into the canister and through the opposite endwall. The end of the alignment tool is engaged with the keyed end stud of the inflator. The alignment tool is then retracted through the opening, together with the keyed end stud, so that the end stud is positioned within the opening and its keyway. The alignment tool is then disengaged and removed.

BRIEF DESCRIPTION OF THE DRAWINGS

FIG. 2 is a perspective view of the alignment tool and the inflator stud;

FIG. 3 is an enlarged elevational view of the alignment tool and end stud within the reaction canister and prior to engagement;

FIG. 4 is a cross-section taken substantially along the line 4—4 of FIG. 3; and

FIG. 5 is a view similar to FIG. 4 illustrating the end stud and alignment tool in full engagement and the stud properly positioned in the keyed opening.

BEST MODE FOR CARRYING OUT THE INVENTION

Figure 1:
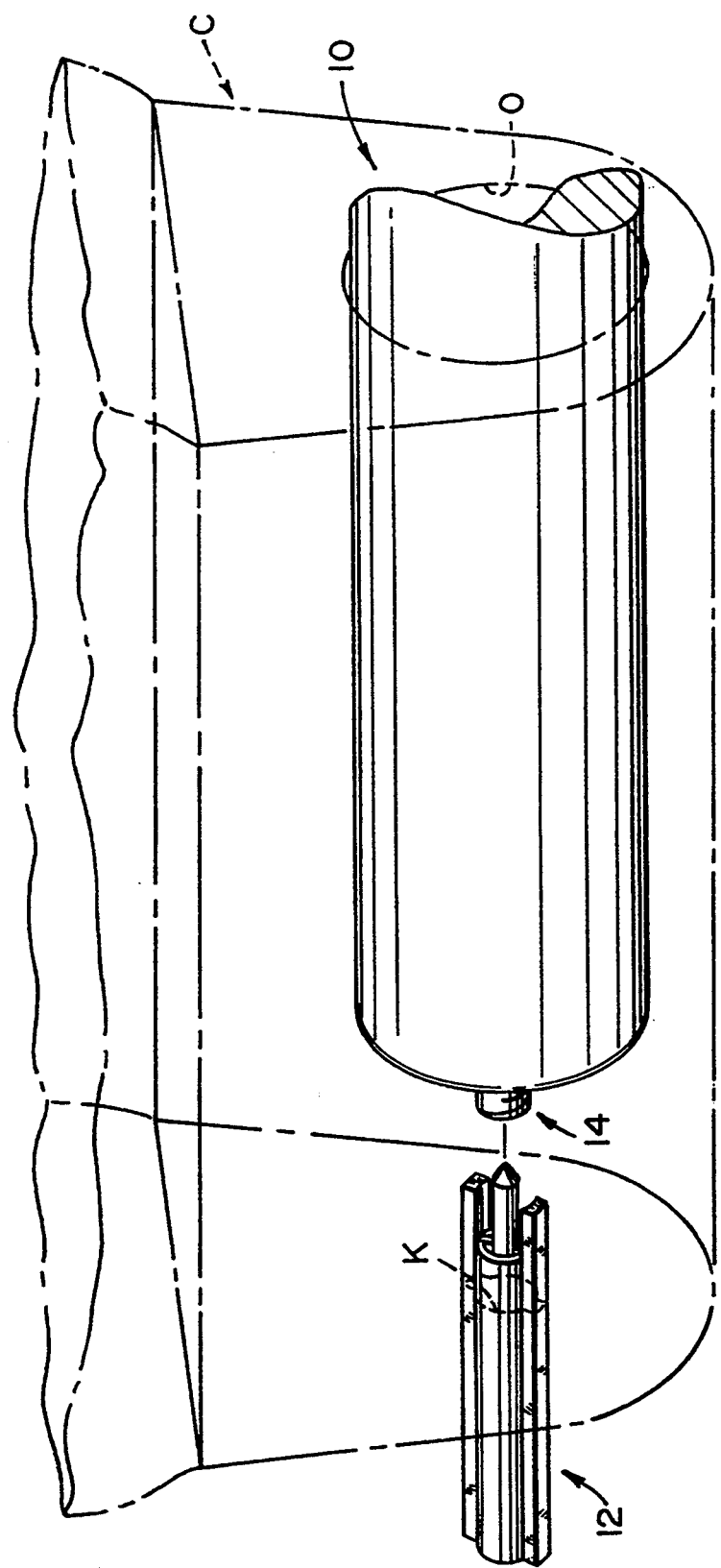
FIG. 1 is a perspective illustration of an airbag inflator and an alignment tool being inserted into a reaction module canister.

FIG. 1 illustrates in phantom an airbag module canister C having one endwall defining an opening O and an opposite endwall defining a keyway K. A cylindrical inflator 10 is shown being inserted through the opening O for alignment with the keyway K by means of an alignment tool 12, as will be explained.

The keyway K in the endwall of canister C may have any non-circular shape. In the illustrated embodiment it has a profile in the form of a rectangle superimposed upon a circle. The inflator 10 carries an end stud 14 which comprises four basic elements. The first element making up the stud 14 is a key 16. The key 16 has a profile matching that of the keyway K—namely, a cylinder 18 and a pair of diametrically extending rectangular shoulders 20. The key 16 is dimensioned to fit snugly within the keyway K of the reaction module canister. Extending outwardly from the key 16 is a threaded mounting post 22. The end of stud 14 carries a cylindrical alignment member 24. The alignment member 24 is characterized by a diametric slot 26 which extends along its end face and an axially extending countersink 28.

The alignment tool 12 comprises a cylindrical main body 30 having a relatively long internal bore 32. The long bore 32 may extend, for example, for a distance amounting to 90% of the length of main body 30. A short bore 34 (FIG. 2) extends inwardly a short distance from the end of the main body 30, leaving a wall 36 (FIG. 4) between the two bores. An axial hole 38 is drilled through the wall 36. A diametrical slot is cut into the end of main body 30. The slot extends across the short bore 34 to the depth of the wall 36. A pair of substantially rectangular ribs 40 are mounted in the ends of the slot as shown in FIG. 4, leaving an axial opening there between aligned with the hole 38 in the wall 36. An alignment pin 42 extends through the hole and between the ribs 40 from an enlarged cylindrical body portion 44 retained behind the wall 36. The outermost end of the alignment pin 42 carries a conical point 46. The alignment pin 42 is forced resiliently outwardly from the main body 30 by a coil spring 48 carried within the long bore 32 and retained by an end plug 50. The alignment tool 12 is completed by a pair of alignment rails 52 which extend along diametrically opposite sides of the main body 30 to a point of appropriate dimensional relation to wall 36 which corresponds to the relation between the end of cylindrical alignment member 24 and key 16 as shown in FIGS. 2–4.

It is important to note that the profile of the alignment tool 12, as viewed from its end, is identical to the profile of the keyway K in the endwall of the reaction canister C. Furthermore, its dimensions are such that it may be easily passed through the keyway K.

Operation

When the inflator 10 is to be assembled in the reaction canister C, the assembler passes the cylindrical inflator through the opening O, stud 14 first, as illustrated in FIG. 1. At the same time he or she passes the alignment tool 12 through the keyway K, also as shown in FIG. 1.

The alignment tool 12 is guided by feel until the conical point 46 of the alignment pin 42, as shown in FIG. 2, engages the countersink 2e in the end of the stud 14 of inflator 10. This ensures the alignment of the inflator 10 with the keyway K.

Alternatively, "blind" assembly may be avoided altogether if the alignment tool 12 is sufficiently long to extend completely through the canister C and opposite opening O. In that case, the stud 14 may be engaged outside the canister C.

The proper rotational placement of the inflator 10 is achieved by forcing the inflator and the alignment tool together. This forces the alignment pin 42 into the alignment tool 12 against the force of spring 48. The inflator 10 is then rotated by the assembler until the slot 26 in the end of the stud 14 becomes aligned with and receives therein the ribs 40 of the alignment tool, as illustrated in FIG. 5. At the same time, the ends of the alignment rails 52 bear against the shoulders 20 of the key 16. In this position, the key 16 at the base of the stud 14 is aligned with the keyway K in the endwall of the canister C.

The inflator 10 is then advanced, while the tool 12 is simultaneously retracted, through the keyway K until the key 16 is fully positioned within the keyway. The alignment tool 12 is then removed and the inflator is secured in its proper position within the reaction canister by a nut (not shown) threaded in the usual manner onto the mounting post 22.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

We claim:

1. The method of assembling an airbag inflator having a keyed end stud into an airbag module reaction canister having a wall defining an opening with a keyway having a profile adapted to receive said keyed end stud which comprises:

providing an alignment tool having means for engaging said keyed end stud and a profile matching the profile of said opening and keyway;

inserting said alignment tool from without said canister through said wall opening and keyway;

engaging the stud engaging means of said alignment tool with the keyed end stud of said airbag inflator;

retracting said alignment tool and keyed end stud through said opening to position said keyed end stud in said opening and keyway; and disengaging and removing said alignment tool from said end stud.

2. The method of claim 1 including the additional step of rotationally aligning said stud with said stud engaging means in a preselected relationship prior to retracting said alignment tool.

3. An alignment tool for guiding and positioning a keyed end stud of an airbag inflator into a matching opening and keyway in a wall of an airbag module reaction canister which comprises:

an elongated body member having an outer profile matching said opening and keyway, permitting a first end of said body member to be passed therethrough and into said canister; and means on said first end of the body member for engaging and rotationally positioning said keyed end stud to form an extension of the outer profile of said body member to permit said body member to be retracted through said opening while advancing said keyed end stud into said opening.

4. The tool of claim 3 wherein said engaging and positioning means comprises at least one rib adapted for insertion into a slot in said end stud.

5. The tool of claim 4 wherein said engaging and positioning means comprises first and second diametrically positioned ribs.

6. The tool of claim 5 wherein said engaging and positioning means further comprises a spring-loaded pin having an end engageable with a depression in said end stud.

7. The tool of claim 4 wherein said engaging and positioning means comprises a spring-loaded pin having an end engageable with a depression in said end stud.

8. The tool of claim 7 wherein said elongated body member comprises a cylinder having a longitudinal axis and said engaging and positioning means comprises first and second alignment rails extending therealong parallel to said longitudinal axis and beyond an end of said cylinder.

9. The tool of claim 8 wherein said alignment rails are on diametrically opposite sides of said cylinder.

10. The tool of claim 7 wherein said engaging and positioning means comprise first and second diametrically positioned ribs.

11. Apparatus including an airbag inflator and an alignment and assembly tool for assembling said airbag inflator within an airbag module reaction canister having a wall defining an opening and keyway therethrough wherein A. said inflator comprises:
  (1) a key extending outwardly from said inflator along an axis, said key having a shape conforming to the shape of said opening and keyway and receivable therein;
  (2) a threaded mounting stud extending outwardly from said key along said axis and terminating in an alignment member defining at least one radial slot perpendicular to said axis and an axially extending countersink; and
B. said alignment and assembly tool comprises:
  (1) an elongated body member having an outer profile matching the key on said inflator, permitting a first end of said body member to be passed through said opening and keyway and into said canister;
  (2) a spring-loaded pin extending outwardly from said first end and engageable with said countersink;
  (3) at least one radial rib on said first end of the body member for engaging and rotationally positioning said radial slot upon depression of said spring-loaded pin whereby the key on said inflator forms an extension along said axis of the outer profile of said body member to permit said body member to be retracted through said opening while advancing said key into said opening.

12. An airbag inflator which comprises:

a substantially cylindrical body member having two ends;

a key extending outwardly from one end of said body member along a longitudinal axis of said body member, said key having a non-circular shape conforming to the shape of an opening into which it is to be mounted; and a threaded mounting stud extending outwardly from said key along said longitudinal axis and terminating in an alignment member defining at least one radial slot perpendicular to said longitudinal axis.

13. The airbag inflator of claim 12 which additionally comprises an axially extending countersink in said alignment member.

* * * * *